Figure 1:
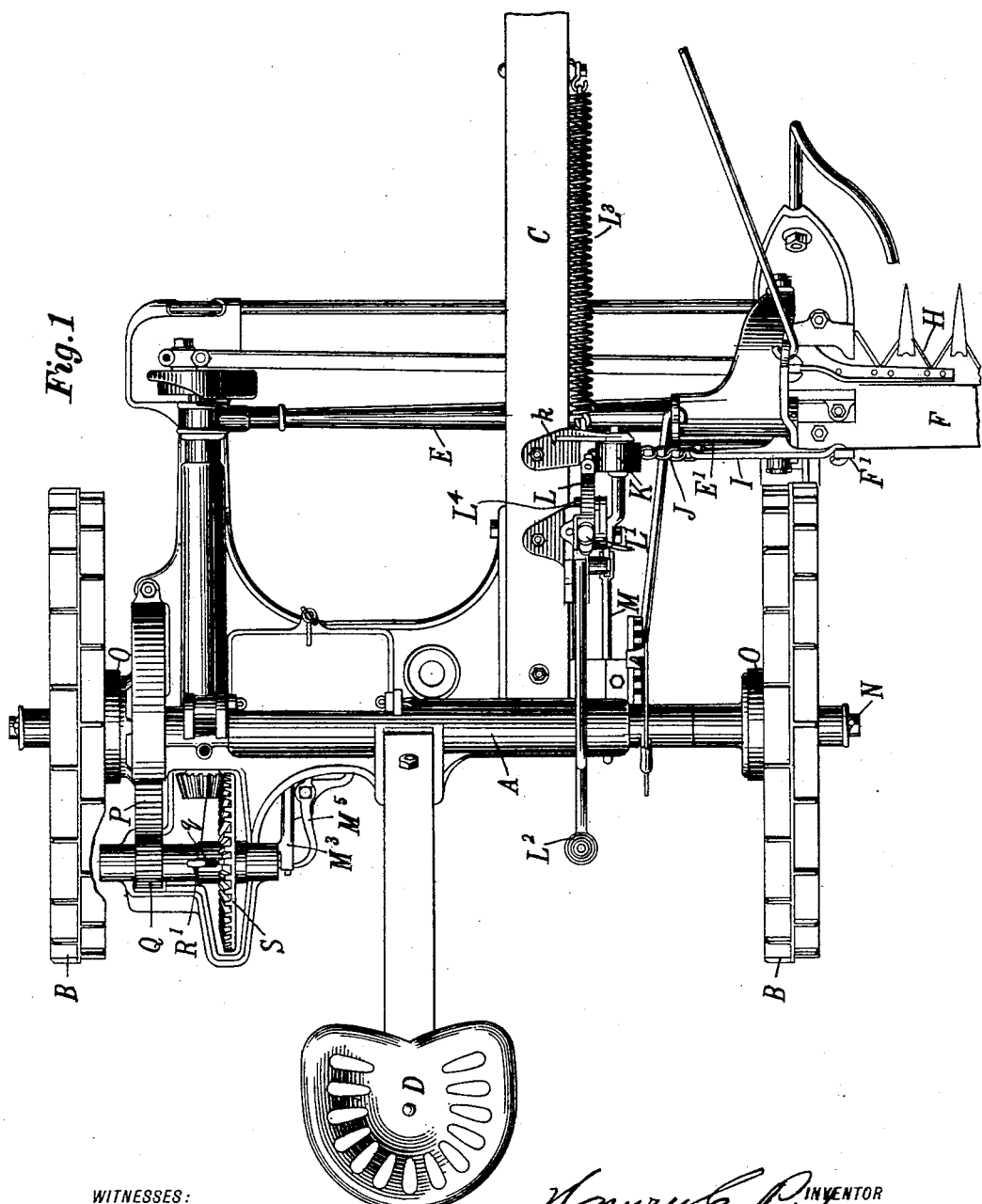

(No Model.) 8 Sheets—Sheet 1.

H. E. PRIDMORE.
MOWING MACHINE.

No. 586,392. Patented July 13, 1897.

WITNESSES:
E. E. Clinton.
John M. Culver

INVENTOR
Henry E. Pridmore
BY C. B. Swift.
ATTORNEY.

(No Model.)

H. E. PRIDMORE.
MOWING MACHINE.

No. 586,392.

8 Sheets—Sheet 2.

Patented July 13, 1897.

WITNESSES:
E. E. Clinton.
John M. Culver.

INVENTOR
Henry E. Pridmore
BY R. B. Swift.
ATTORNEY.

THE NORRIS PETERS CO., PHOTO-LITHO., WASHINGTON, D. C.

(No Model.) 8 Sheets—Sheet 6.

H. E. PRIDMORE.
MOWING MACHINE.

No. 586,392. Patented July 13, 1897.

WITNESSES:
E. E. Clinton
John M. Culver

INVENTOR
Henry E. Pridmore
BY R. B. Swift.
ATTORNEY.

(No Model.) 8 Sheets—Sheet 7.

H. E. PRIDMORE.
MOWING MACHINE.

No. 586,392. Patented July 13, 1897.

WITNESSES:
E. E. Clinton
John M. Culver

INVENTOR
Henry E. Pridmore
BY R. B. Swift
ATTORNEY.

(No Model.) 8 Sheets—Sheet 8.
H. E. PRIDMORE.
MOWING MACHINE.
No. 586,392. Patented July 13, 1897.
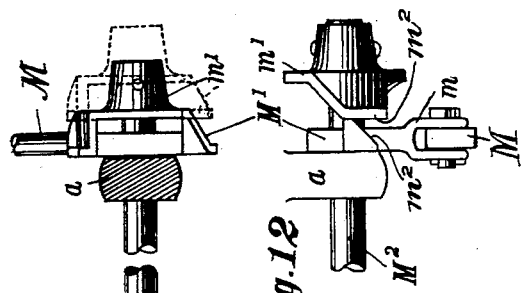
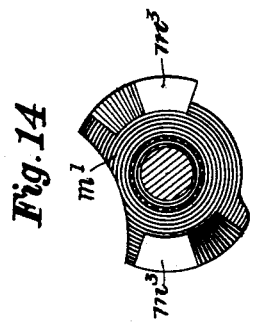
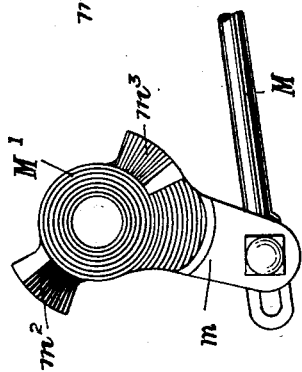
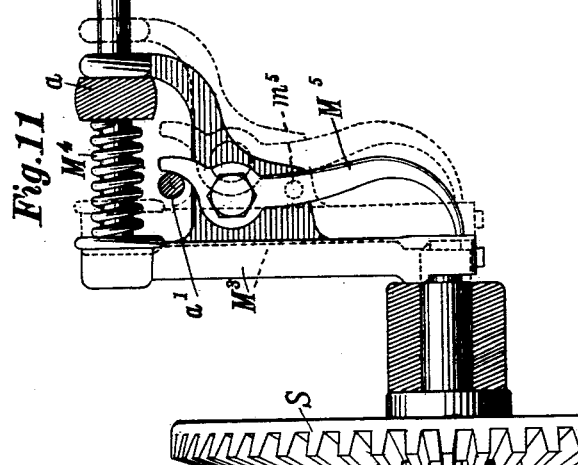
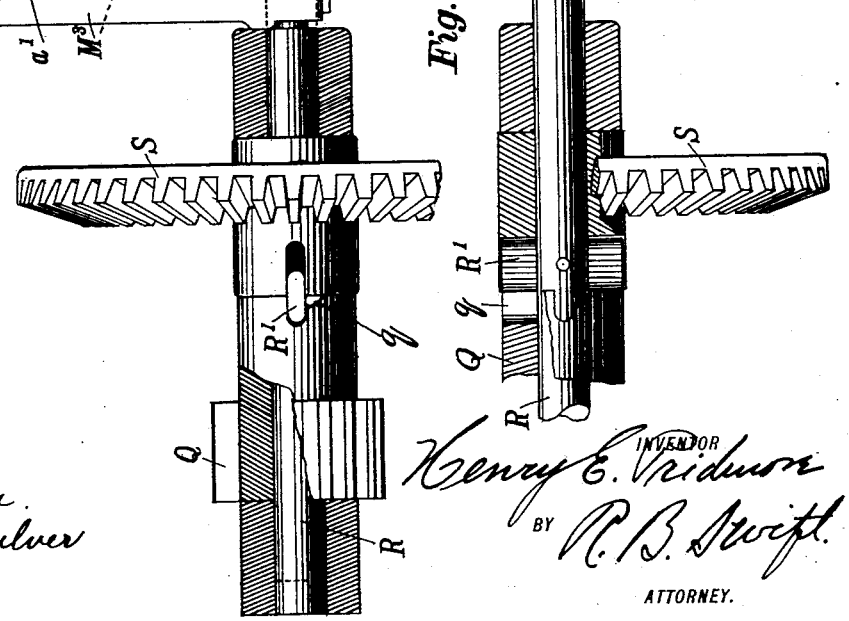
WITNESSES:
E. E. Clinton.
John M Culver
INVENTOR
Henry E. Pridmore
BY R. B. Swift
ATTORNEY.

UNITED STATES PATENT OFFICE.

HENRY E. PRIDMORE, OF CHICAGO, ILLINOIS, ASSIGNOR TO THE McCORMICK HARVESTING MACHINE COMPANY.

MOWING-MACHINE.

SPECIFICATION forming part of Letters Patent No. 586,392, dated July 13, 1897.

Application filed January 17, 1896. Serial No. 575,845. (No model.)

*To all whom it may concern:*

Be it known that I, HENRY E. PRIDMORE, a citizen of the United States, residing at Chicago, in the county of Cook and State of Illinois, have invented certain new and useful Improvements in Mowing-Machines, of which the following is a specification.

My invention relates to that part of a mowing-machine which has to do with the handling of the coupling-frame and finger-bar when they are to be lifted to pass obstructions or for transportation on the road, and has more particular reference to means for throwing the finger-bar into a more nearly vertical position than is common in mowers having long pitmen which transmit the motion from the gear on one side of the machine to the knife working in the finger-bar on the other side of the machine. This throwing of the finger-bar into a vertical position by the operator when in the seat of the machine by a single stroke of the lever is very desirable in those fields where there are many obstructions, such as trees, stumps, and large stones. It has, however, been impossible to throw the finger-bar into a vertical position when the mower was in motion unless the power reciprocating the knife came from a short pitman that followed the vertical movement of the finger-bar, thus allowing a stroke of the knife. These short-pitman mowers have never been so durable as nor has it been possible to construct them without making them far more costly than the ordinary long-pitman machine. They have been of heavy draft, and their weight being largely on the inside of the wheel they have been poorly balanced.

My invention has to do with the adapting of an ordinary long-pitman mower so that the cutter-bar can be thrown vertical from the seat and during the raising of the coupling-frame and finger-bar at the instant the pitman and knife approach such an angle as to begin to bind the knife in the finger-bar the gearing which drives the knife shall be unclutched and the finger-bar continue its upward movement to the side of the machine. When the finger-bar is to be dropped into working position and it reaches that point where the knife can be given a stroke by the pitman, the gearing is again automatically clutched, and when the bar has reached the ground the machine is ready for operation. It is in the special devices to control the relative movements of the coupling-frame and finger-bar, to the form and arrangement of the lifting-lever, to the connection of the lifting-lever with the unclutching mechanism, to the form of the clutch, and to the arrangement and positioning of the gear that my invention particularly relates.

The mechanisms will be more particularly described and their advantages pointed out in the following specification. This will be done with reference to the drawings, in which—

Figure 2:
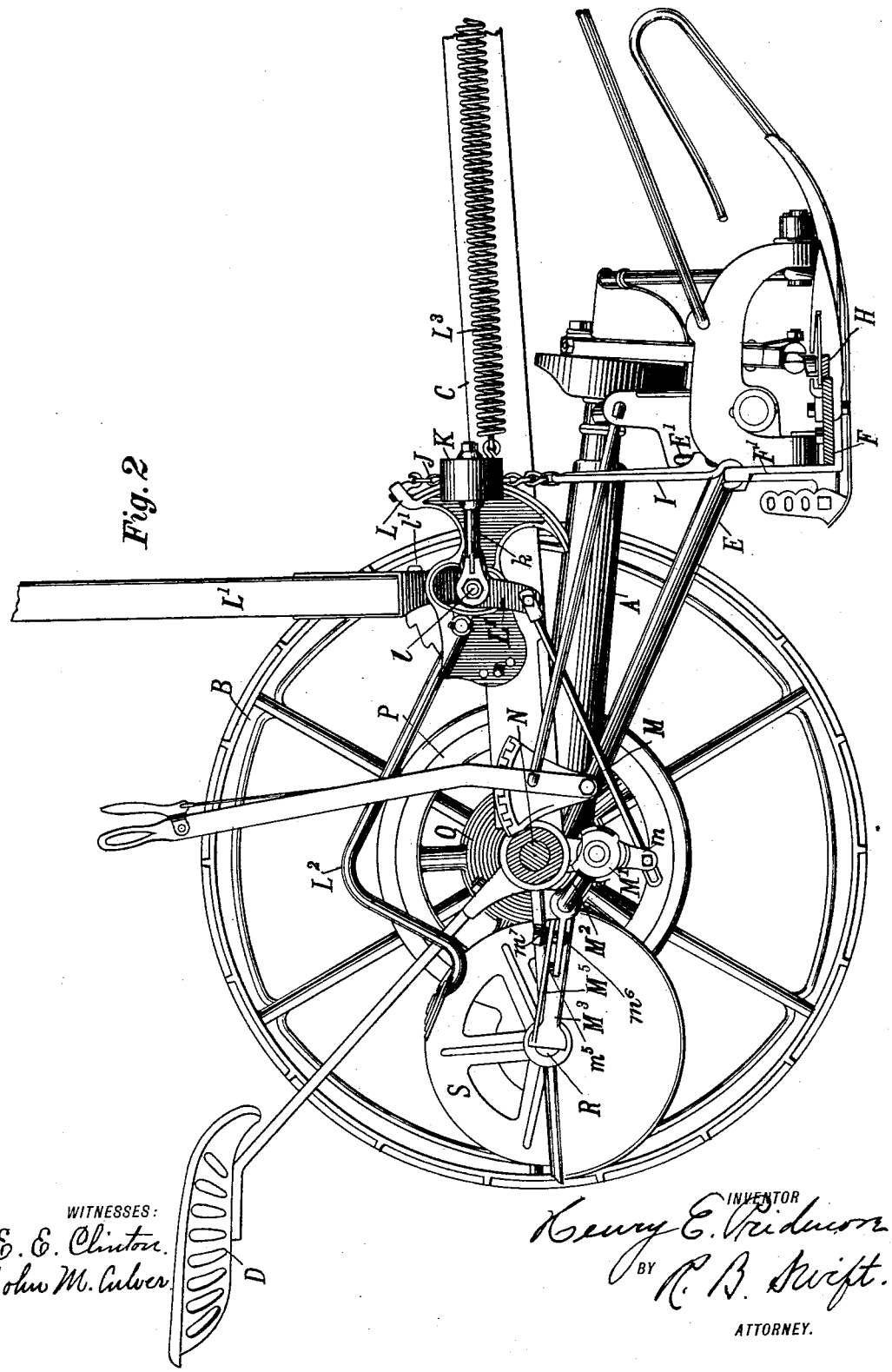
Figure 3:
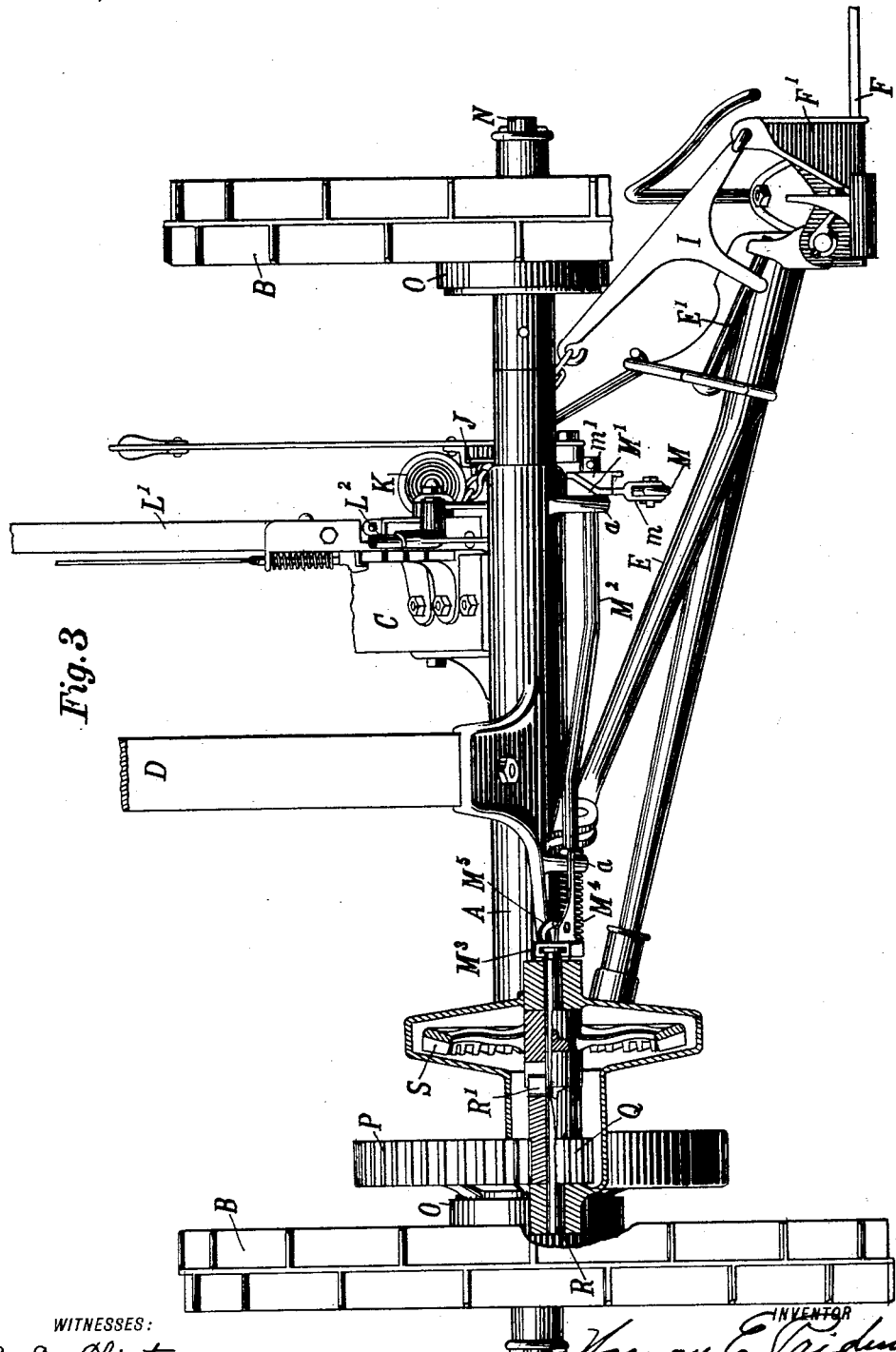
Figure 4:
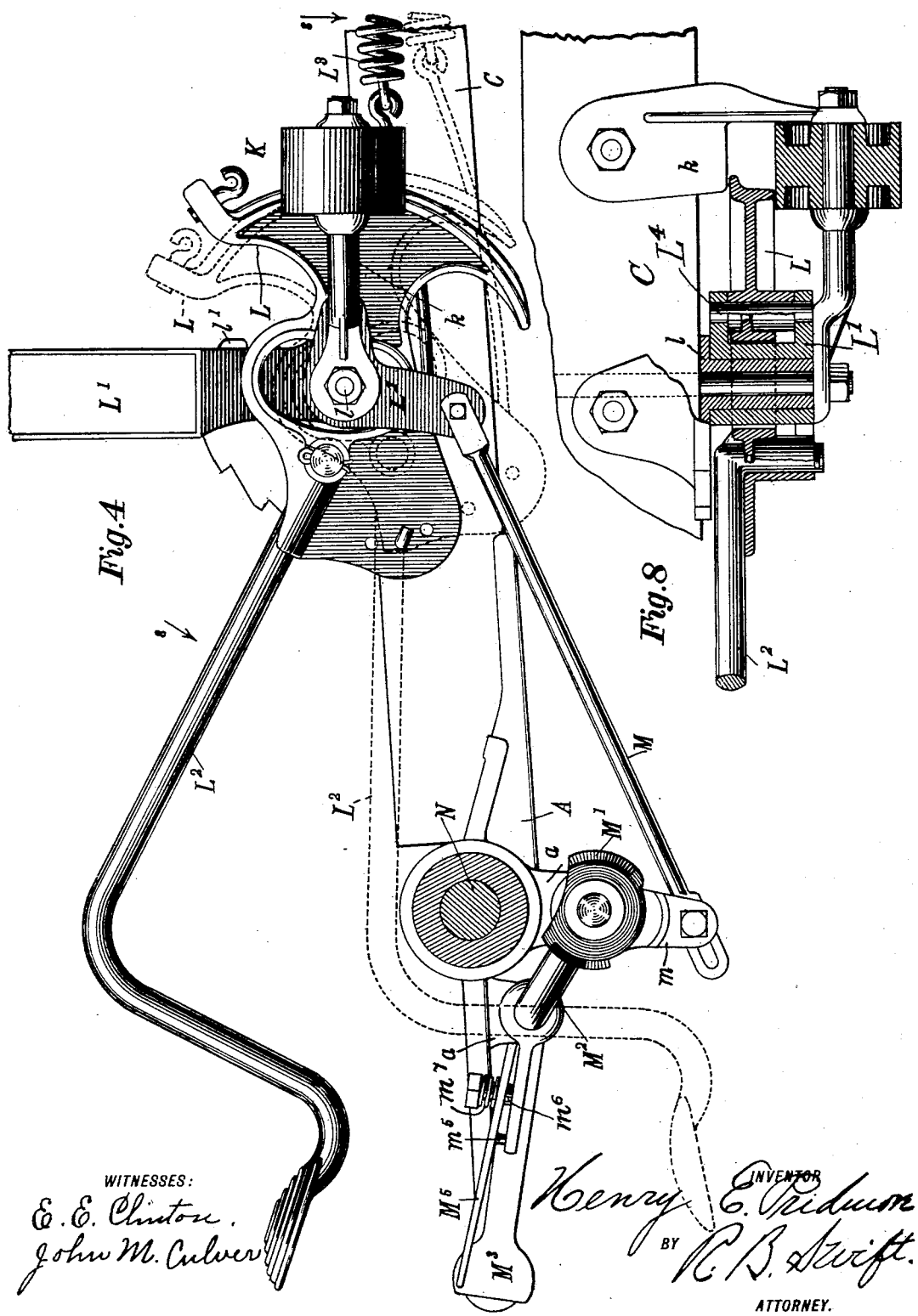
Figure 5:
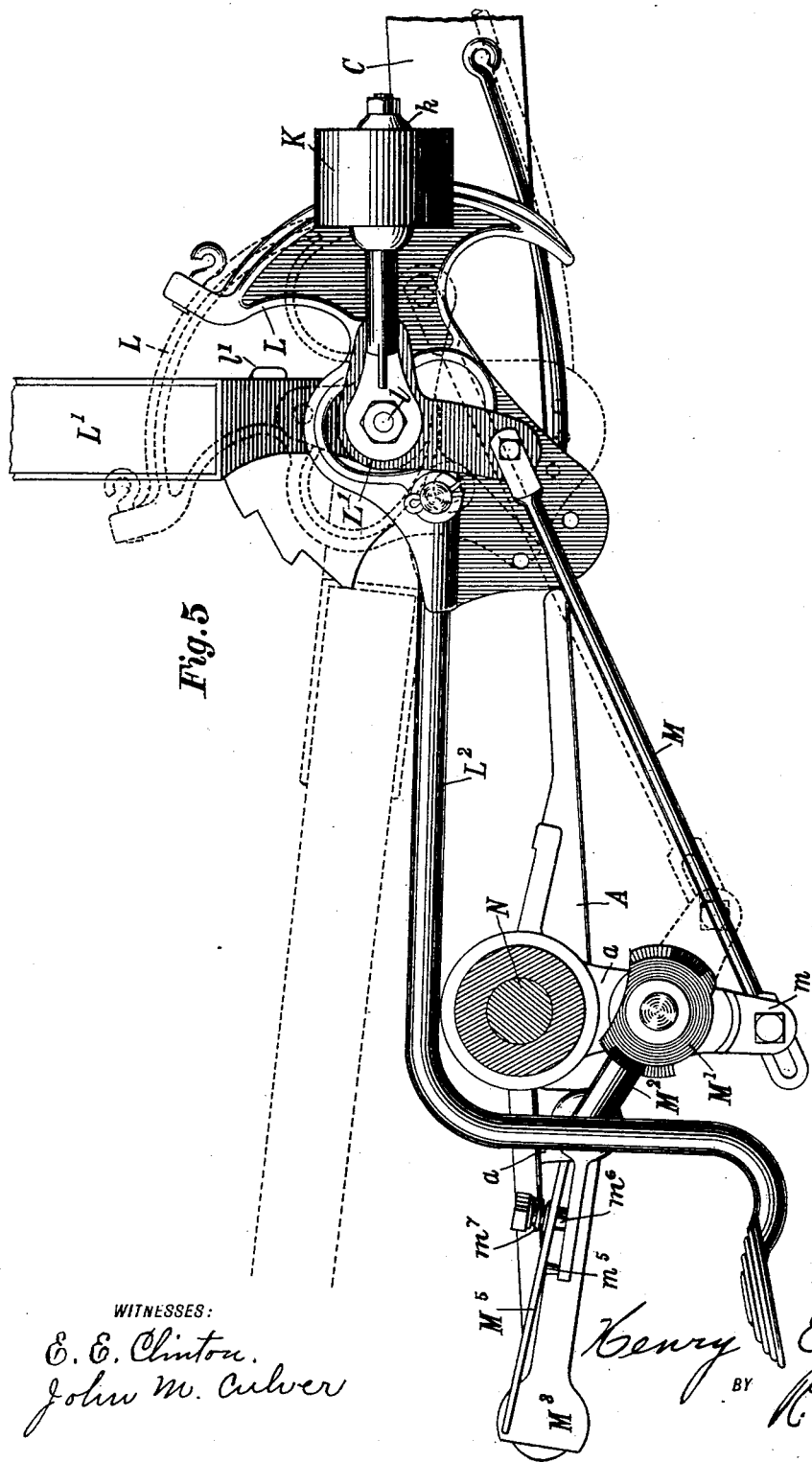
Figure 6:
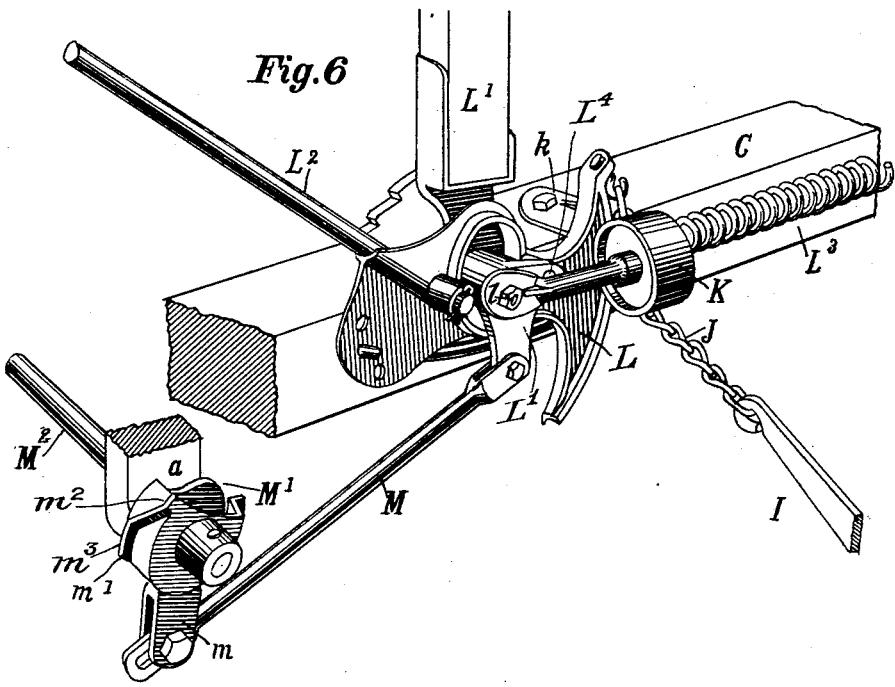
Figure 7:
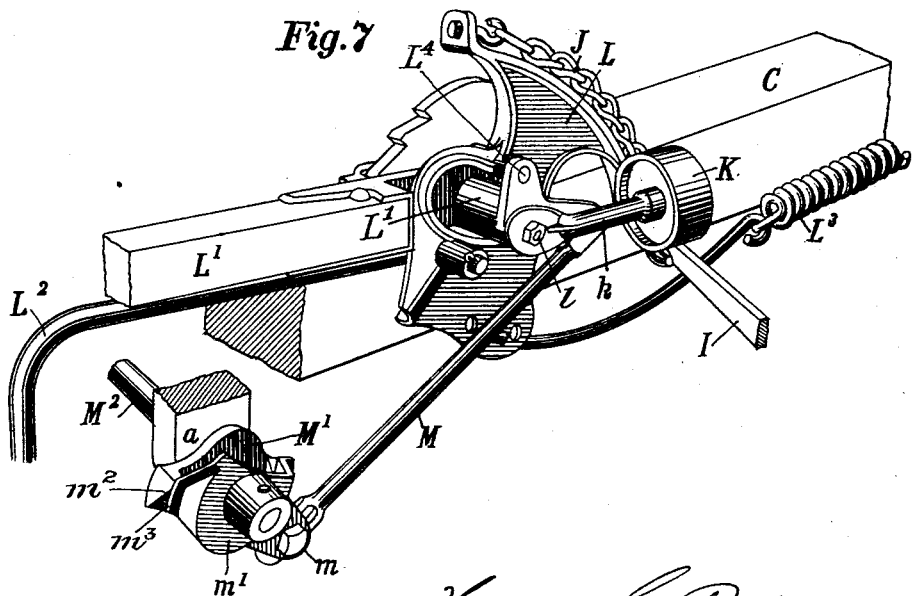
Figure 9:
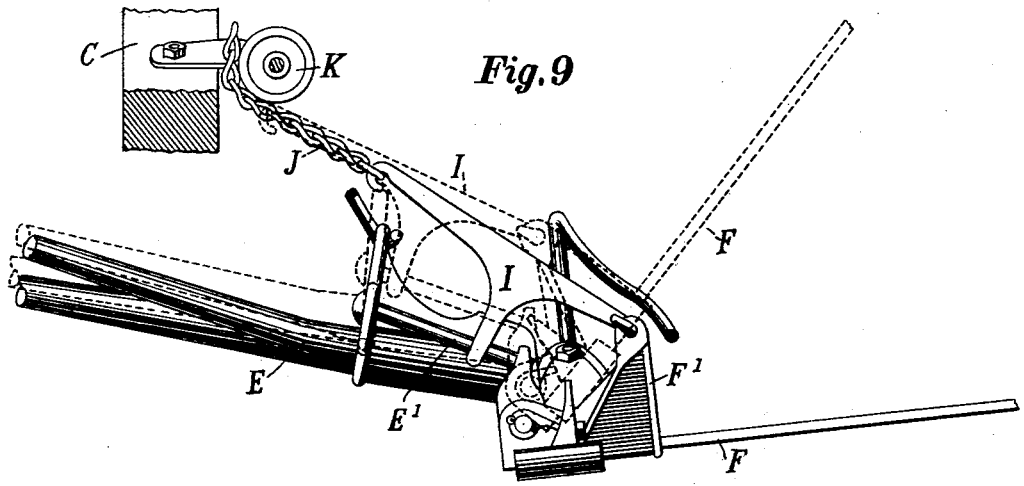
Figure 10:
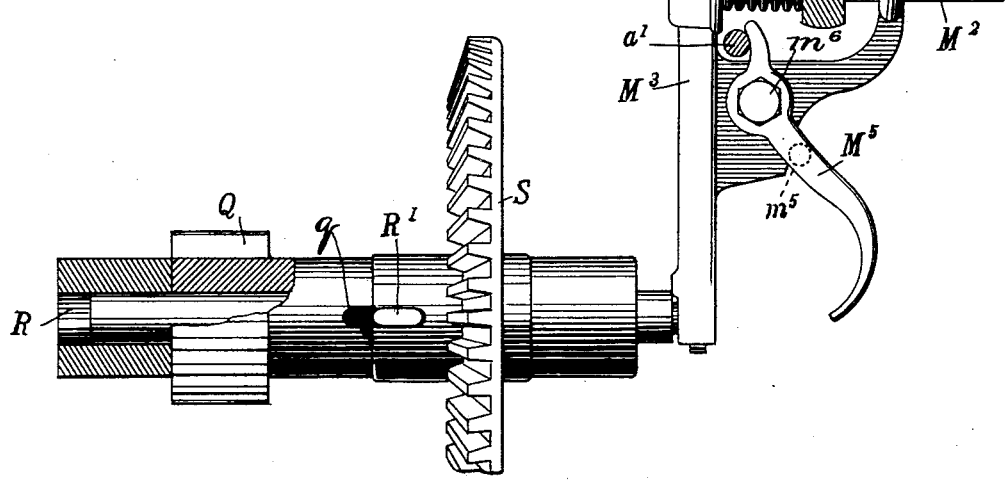

Figure 1 is a top view of a mowing-machine containing my invention. Fig. 2 is a side view with one wheel removed to more clearly show the parts of my invention. Fig. 3 is a rear view with a part of the inside wheel broken away and the gear and frame which covers the gear partly in section. Fig. 4 is an enlarged detail of the lifting and foot levers, with a connection to the unclutching-rod, and showing in dotted lines the position of the parts that follows from the lifting stroke given by the foot-lever. Fig. 5 is a view of the same parts, showing in full lines the position of the parts that follows from the lifting stroke given by the foot-lever and in dotted lines that which follows from the hand-lever. Fig. 6 is a perspective view of the same parts when the machine is at work. Fig. 7 shows the same parts when the finger-bar has been thrown to its highest point. Fig. 8 is a sectional plan view of the lifting-lever and its parts on the line 8 8 of Fig. 4. Fig. 9 is an enlarged detail showing the sliding three-pronged link which connects the finger-bar and coupling-frame. Fig. 10 is an enlarged detail of the unshipping-rod and the gear, with the counter-shaft turned to show the end of the clutch-pin. Fig. 11 is an enlarged detail of the same parts, together with the cam that actuates them. In dotted lines is shown the position of the unshipping-rod and cam when the parts are unclutched. Fig. 12 is a detail of this cam in a different position. Figs. 13 and 14 are end views of these cams, while Fig. 15 is an enlarged view, partly in section, of the gear, showing the clutch-pin and counter-shaft.

Referring to the drawings, A is the main frame, B the wheels, C the tongue, D the seat, E the coupling-frame, F the finger-bar, and H the knife, of a mowing-machine. These parts may be any of the well-known forms of these parts of a mowing-machine, as my invention can be applied to any of the ordinary types that have their gearing arranged on the side of the machine more nearly to the outer wheel, and that transmits the rotary motion of the gear to the knife by means of a long pitman.

The folding of the finger-bar to a vertical position at the side of the machine is made up of two movements—viz., the upward movement of the coupling-frame and finger-bar horizontally and then the continued upward movement of the outer end of the bar toward a vertical position. In order that the machine shall be successful in operation, these movements must take place together, the outer end of the finger-bar being lifted with more rapidity than the inner end. It is also imperative that the relation between the finger-bar and coupling-frame shall be retained and that the movement of the one in relation to the other be confined within definite limits.

The trouble with those constructions that have heretofore been designed to accomplish the objects of this invention, all of which have failed, has been that a definite relation between the finger-bar and coupling-frame was not maintained. If for any cause the coupling-frame was accidentally lifted, such slackness would ensue as would allow the outer end of the finger-bar to drop. If the outer end of the finger-bar was accidentally raised, the slackness resulting therefrom would allow the coupling-frame to drop, and if these movements took place just at the time of the unclutching or clutching of the machine serious results would follow.

The first feature of my invention has to do with the maintaining of a definite relation between the finger-bar and coupling-frame, and this I accomplish by means of the sliding three-armed link I. One arm of this link is connected to the post F' on the finger-bar, while the hole in another arm slides on the slightly-inclined rod E' of the coupling-frame E. The lifting-chain J is attached to the other arm, and, passing beneath the pulley K, is attached to the lifting device.

It will be noticed that the pull upon the lifting-chain J is almost directly in line with the direction of the finger-bar and that the first movement upon the parts would be to raise the outer end of the bar, the link I sliding on the rod E', while the continued lifting pull would continue to raise the finger-bar, and at the same time the coupling-frame would be lifted vertically into a higher plane. The end of the link I is finally drawn beneath the pulley and any strain thrown upon it would be nearly in a direct line to keep the finger-bar in its upward position and the coupling-frame and finger-bar would be held from the ground. Any further upward movement of the finger-bar would be prevented by the arm of the link I striking against the end of the rod E', and any extreme of downward movement would be prevented by the same arm striking against the other end of the rod.

The lifting-chain J is connected to a hook on the front end of the primary lever L, which in turn is pivoted at $L^4$ to the lifting-lever L' at a point outside of the pivot of the lever L' on the frame of the machine. By reference to Fig. 8 it will be seen that the lifting-lever L' is pivoted on the stud $l$, which is bolted to the tongue C of the machine. An elongated slot in the primary lever L encircles the pivot of the lifting-lever and on the rear end of the primary lever L the foot-lever $L^2$ is pivoted on a one-way joint. The lifting-lever spring $L^3$ extends along the side of the tongue, as shown in Fig. 2, and is attached to the primary lever L on the other end of the lever from the chain J and tends by its resiliency to rock the primary lever L on its stud, thus pulling upon the chain J, through which its force is transmitted to the coupling-frame and finger-bar.

The pulley K is mounted on a bracket $k$, that is attached to the tongue C and to the outer end of the lifting-lever stud $l$. It is thus positioned to withstand the downward and outward stress of the finger-bar and coupling-frame upon the lifting-chain. It is also so positioned that it holds the lifting-segment of the primary lever L from being twisted to the side, and the segment resting against it throughout the limit of its movement rolls upon it, thus preventing friction and rendering the lifting action much easier than as though the lifting parts withstood the strain. It is to be noticed that it is of sufficient length so that throughout the movement of the primary lever the segment of the primary lever L will bear upon it. By changing the position of the spring and the different holes in the end of the primary lever L its lifting force can be varied, as the spring will be removed more or less from the pivot of the primary lever upon the hand-lever.

The hand-lever L' in the construction here shown will be held to the forward limit of its movement or against the lock $l'$. It requires no pawl and ratchet to hold it in this position, and the operator when he grasps it to raise the coupling-frame and finger-bar from obstructions does not have to waste time to unlock a ratchet before he can move it. It does not vibrate back and forth, as the coupling-frame and finger-bar conform to the surface of uneven ground, as it would do were the primary lever and hand-lever rigidly connected. It retains its position during the raising movement of the coupling-frame and finger-bar that is given by the foot-lever, and the gearing which is unclutched by it is not disturbed through any of the varying conditions of ground or obstructions that are encountered which are not of sufficient size to justify the use of the hand-lever.

From the dotted lines in Fig. 4 it will be seen that the operator with his foot upon the foot-lever can raise the coupling-frame and finger-bar to a height to pass ordinary obstructions and the unclutching mechanism be undisturbed. The height, however, is not such as to make the angle between the pitman and knife so great that the knife cannot be reciprocated through the finger-bar.

The elongated slot in the primary lever L is of such length and the stress of the spring on one end and the chain on the other end of the pivot of this lever is so great that the lever is held in its normal working position, so that the pivot of the hand-lever is in the center of the elongated slot. If a depression is encountered, the coupling-frame and finger-bar can drop into it to the extent of the length of the elongated slot below the stud, while if a hillock is encountered the lever will swing upward on its pivot until the upper extremity of the slot encounters the stud. If the hand-lever is to be used in raising the parts, without the foot-lever, before it will have effect upon the coupling-frame and finger-bar it will have to form a rigid lock with the primary lever, which in this construction is formed by the extremity of the slot of the primary lever striking the hub of the hand-lever.

It is the purpose of this construction to control the coupling-frame and finger-bar by both a hand and foot lever and have the hand-lever held constantly upright by the stress of the spring, while the foot-lever partakes of the forward and backward movement due to the rise and fall of the coupling-frame and finger-bar. It is the intention that the foot-lever will be sufficient for all ordinary work, such as the going over of small obstructions, the turning of corners, and the ordinary handling of the machine. For all such there is no necessity of the finger-bar being raised vertically by the hand-lever, and of course no necessity of the machine being unclutched.

From the hand-lever L' a link M is extended and connected to the arm $m$ on the cam M', that is loosely mounted on the sliding rod $M^2$, that has bearings in eyes $a\ a$ on the main frame A. On the sliding rod $M^2$ is pinned a companion cam $m'$. One of the eyes $a$ on the main frame prevents the loose cam M' from sliding away from the fixed cam $m'$, and thus any rotation of the cam will move the sliding rod $M^2$ in its bearings. The cams M' and $m'$ are formed of elongated plates having segments of projecting flanges $m^2\ m^2$ on plate M' and $m^3\ m^3$ on plate $m'$, the flanges on one plate projected into the path of the flanges on the other plate, and the plate M' being loosely mounted on the sliding rod $M^2$, so that it can be moved on this rod by its arm $m$. The projecting flanges are beveled, as shown in the drawings. When the cams are in their normal position, with the machines at work, the flanges pass into the path of each other. It is therefore plain that when the cam M' is turned its beveled projecting segment $m^2$ will strike against the beveled projecting segment $m^3$, and the sliding rod $M^2$ be moved on its bearings in the frame of the mower.

The connecting-link M, it will be noticed, has a slot in one end, which slot is of sufficient length to allow for the movement of the hand-lever for a distance that will equal the amount of lift given by the foot-lever—that is, it being undesirable that the machine shall be unclutched for any ordinary movement of the coupling-frame and finger-bar, such, for instance, as the movement given by the foot-lever, as a safeguard the slot is put in the rod, as at times the driver will almost unconsciously clutch the hand-lever to assist in the lifting.

Upon the other extremity of the sliding rod $M^2$ is keyed an unclutching-arm $M^3$, that extends from the rod to the sliding countershaft. A clutch-spring $M^4$ is placed on the sliding rod $M^2$, and bearing against one of the eyes $a$ of the main frame A tends to hold the sliding rod and unclutching-arm to the extremity of its movement in one direction. Any pull of the sliding rod in the other direction, caused by the cams, will be against this spring. The connection between the hand-lever and the unclutching-arm $M^3$ is positive only in one direction. The clutch is positively drawn from engagement, but when the coupling-frame and finger-bar are lowered and the cams are thrown back into normal position the spring must throw the machine into gear. If the ratchets on the gear are not in position just at the instant the coupling-frame and finger-bar are lowered, the mechanism is not harmed, as there is nothing to positively force the clutch into engagement at that interval and the gear can rotate until the ratchets are opposite, when the spring will throw the clutch. This slot in the link M has another office that is more important than those already mentioned, viz: It allows the clutch to be thrown into engagement by the spring on the return movement of the hand-lever with greater rapidity than the hand-lever moves.

It is readily understood that the clutching element must, with the gearing in motion, engage quickly. The natural movement of the hand-lever in letting the coupling-frame and finger-bar down is slow in order to avoid jerking the parts, and if the rapidity of clutching depends on this movement the locking elements of the clutch will be ground off and the gear greatly strained. The link M draws back the cam M', the spring $M^4$ pressing the sliding rod $M^2$ and its cam $m'$ in the direction of clutch engagement. When, however, the diagonal faces of the cams M' and $m'$ come together, the spring throws the sliding rod quickly, and the arm $m$ in place of being pulled by the link is by the force of the spring jumped to the other end of the slot in the link, and the machine is clutched even though the lifting-lever at this interval has remained almost at rest. In the practical work of the field this allowance of the clutch to engage more rapidly than the movement of the lifting-lever will be found of prime importance, and I know of no one who has done so before.

There are occasions, such, for instance, as when the driver wishes to go in front of his machine and does not care to raise the finger-bar and coupling-frame, that for safety he will wish to have unclutched. A hand unclutching-lever $M^5$ being pivoted on the unclutching-arm $M^3$, and bearing against the post $a'$ on the main frame A the operator can throw the sliding rod $M^2$ and the parts will thus be unclutched. The hand clutching-lever $M^5$ has formed integral with it a projecting spur $m^5$. The hand-lever $M^5$ is pivoted on the unclutching-arm $M^2$, and is held thereon by the pivot-stud $m^6$. A spring $m^7$ allows the hand unclutching-lever $M^5$ to be raised so that the projecting spur $m^5$ will, when the hand-lever is moved to throw the clutch out of engagement, drop over the edge of the unclutching-arm $M^2$, and thus lock the clutch out of engagement, the spring $m^7$ holding the lever down to the unclutching-arm.

It will be noticed that the unclutching of the parts by the hand-lever or the clutching of the spring does not disturb the rising and falling of the coupling-frame and finger-bar. In a mowing-machine of the type herein so far described, wherein the gearing must be clutched to the driven portions of the machine while the team is in motion, and the knife reciprocated through the finger-bar while the bar is suspended in air from one end, and in many instances swinging and jumping, causing the knife to bind in the fingers, a considerable power is required to start its reciprocation. Ordinary forms of unclutching mechanism will not stand this difficult work, and it therefore became necessary to improve these parts.

In the drawings, N is the main axle of the machine, on which the wheels B are mounted. These wheels give motion to the gearing by means of ratchet-plates O, keyed to the main axle and provided with the usual ratchets. The forward travel of the machine transmits motion to the main axle, upon which the spur-wheel P is keyed, and this wheel in turn transmits motion to the spur-pinion Q, which is mounted on the counter-shaft R, upon which shaft the bevel-wheel S is also mounted. The counter-shaft R has bearings at both ends in the main frame A.

Attention is called to the fact that the hubs of the spur-pinion Q and the bevel-wheel S are of such length as to entirely fill the main frame where the counter-shaft R passes through it. There can then be no endwise play of either of these pinions, as their hubs bear against the frame and against each other. The teeth upon these parts are thus always in mesh and there is no danger of the teeth being broken, as there would be if they were thrown into engagement under heavy stress. The clutching-tooth is formed by slotting the counter-shaft R and fitting it with a flat steel pin R', which extends through the counter-shaft on both sides to the length of the hubs of the bevel-wheel and spur-pinion and is keyed therein.

A slot is cut in the bevel-wheel S of the same depth as the width of the pin R. Into the spur-pinion Q another slot $q$ is cut of about half the width of the pin R'. The entrance to this slot $q$ in the spur-pinion is cut away somewhat on the side toward which the pinion approaches the pin, so that the pin can make its entrance before it strikes and binds upon the hub of the spur-pinion Q. A groove is cut in the end of the counter-shaft R, and a slot is also cut in the arm $M^3$, which slot takes the groove on the counter-shaft R, and as the sliding rod $M^2$ is slid back and forth the counter-shaft R is drawn with it, thus pulling the shaft so that the flat pin R' will be entirely within the slot in the bevel-wheel, and thus out of engagement with the spur-pinion Q, which is loosely mounted on the counter-shaft R, and even though the main axle and spur-wheel P continue in motion the remainder of the mechanism of the machine will be unclutched. When the counter-shaft R is released, the spring $M^4$ will force it endwise until the flat pin R' will enter the slot in the spur-pinion Q, the pin thus forming a lock between the spur-pinion and bevel-wheel, and the machine will be clutched.

The fact heretofore referred to that the spur-pinion and bevel-wheel are held from endwise movement because they completely fill the frame of the machine is very essential to the proper working of a clutch of this kind. In the ordinary mowing-machine, where it is usually the custom to stop the mower and relieve the parts from strain at the time of clutching, it makes little difference if the parts have a slight endwise movement at the time of the drawing of the clutch, but in a mower where the parts are thrown from and into gear under motion and under strain it becomes of the utmost importance that there be no play of any kind. The close fitting of the spur-pinion and bevel-wheel prevents any shearing of the pin R', such as would result were there any play between these parts.

While the sliding link I, the lifting-lever, the connection from the lifting-lever to the clutch, and the gearing are specially adapted to form a practical arrangement when combined and used together, still the parts are capable of separate use on machines having other means of performing certain of the steps in the combination. These parts are also useful separately. For instance, the sliding link can be used with any kind of a raising device, while the raising device, leaving off the connection with the clutch, can be used on any of the ordinary types of mowers. The gearing would be novel and useful in any mowing-machine whether the finger-bar was to be raised vertically from the seat or not.

I am aware that the idea of unclutching the knife when the cutter-bar is to be thrown vertically from the seat is not new. I do not, therefore, claim such broadly.

The mowers built in accordance with the constructions heretofore shown have not been practically operative in the field. My construction has proven its practical working qualities.

What I desire to secure by Letters Patent is—

1. In combination with the coupling-frame and finger-bar of a mowing-machine, a rigid link joining the two and sliding on the coupling-frame, a lifting device mounted on the frame and connected with the link, the link moving toward the machine-frame when the coupling-frame and finger-bar are raised.

2. In a mowing-machine a link attached to the finger-bar and connected to the coupling-frame by a bearing, on which it slides toward the frame of the machine when the coupling-frame and finger-bar are raised, in combination with a lifting device mounted on the machine-frame and connected with the link.

3. In a mowing-machine in combination with the coupling-frame and finger-bar jointed thereto, a link one arm of which is connected to a post on the finger-bar, a lifting device mounted on the machine-frame and connected to the other end of the link, the link being shorter than the distance between the post on the finger-bar and the vertical plane in which the lifting device is situated, and a guide on the coupling-frame along which the link moves when the coupling-frame and finger-bar are being lifted.

4. In combination in a mowing-machine with a coupling-frame pivoted to the main frame and a finger-bar pivoted to the coupling-frame, a link connected to the finger-bar, an inclined bearing on the coupling-frame along which the link slides, a lifting device on the main frame, the lifting device being positioned on the machine-frame outwardly and upwardly from the link to which it is attached.

5. In a mowing-machine in combination with a rising-and-falling coupling-frame and finger-bar, a hand-lever pivoted on the machine-frame, a primary lever pivoted on the hand-lever on a pivot outside of the pivot of the hand-lever, a connection between the primary lever and the coupling-frame, and a spring reacting between the frame of the machine and the primary lever, substantially as and for the purpose specified.

6. In a mowing-machine in combination, a hand-lever pivoted on the machine-frame, a primary lever pivoted on the hand-lever at a point in advance of the pivot of the hand-lever on the machine-frame, a connection from the primary lever to the rising-and-falling portion of the cutting apparatus, a spring reacting between the primary lever and the machine-frame, and a foot-lever pivoted to the primary lever, substantially as and for the purpose specified.

7. In a mowing-machine in combination, a hand-lever pivoted on the machine-frame, a primary lever pivoted on the hand-lever at a point in advance of the pivot of the hand-lever, bearings on the primary lever which limit its movements up and down in relation to the hand-lever, and a spring reacting between the frame of the machine and the primary lever and tending to transmit its force through the primary lever to the rising-and-falling portion of the cutting apparatus, substantially as and for the purpose specified.

8. In combination in a mowing-machine, a hand-lever pivoted on the machine-frame, a primary lever pivoted on the hand-lever and at a point outside the pivot of the hand-lever, the primary lever being connected with the rising-and-falling portion of the cutting apparatus, a spring reacting between the primary lever and the frame, a slot in the primary lever that encircles the pivot of the hand-lever, the metal at the extremities of which slot forms stops that limit the movement of the primary lever, substantially as and for the purpose described.

9. In combination in a mowing-machine, a hand-lever pivoted on the machine-frame, a primary lever pivoted to the hand-lever at a point in advance of the pivot of the hand-lever on the machine-frame, and a spring reacting between the primary lever and the machine-frame, the primary lever being connected to the rising-and-falling portion of the cutting apparatus, the stress of the spring being exerted thereon through the primary lever whereby the rising-and-falling portion of the cutting apparatus is lightened on the ground and its weight transferred to the hand-lever.

10. In combination in a mowing-machine, a hand-lever pivoted on the machine-frame and free to move in the direction that raises the coupling-frame and finger-bar, a stop on the frame that limits the movement of the hand-lever in the other direction, a primary lever pivoted on the hand-lever by a pivot on the same side of the hand-lever as the stop of the hand-lever on the machine-frame, the primary lever being connected at one end to the rising-and-falling portion of the cutting apparatus, a spring reacting between the frame and the other end of the primary lever, and stops on the primary lever to limit its movement in relation to the hand-lever whereby the force of the spring is transmitted through the primary lever to the cutting apparatus, tending to lighten it on the ground, the strain of which is transmitted to the hand-lever, holding it against its stop on the machine-frame.

11. In combination in a mowing-machine, a lifting device pivoted on the machine-frame consisting of a lever having a quadrant that is flexibly connected to the rising-and-falling portion of the coupling-frame and finger-bar, a roller so positioned and attached to the frame as to bear against the edge of the lifting-quadrant and hold the lifting-chain upon the quadrant, whereby the roller sustains any side stress on the lifting-quadrant.

12. In combination in a mowing-machine, a hand-lever pivoted on the machine-frame, a link extending from the hand-lever to a cam arranged to unclutch the machine, a stop on the machine-frame against which the hand-lever rests, a primary lever pivoted to the hand-lever at a point on the hand-lever on the same side of its pivot as the stop on the machine-frame, a spring reacting between the primary lever and the machine-frame, the primary lever being connected to the coupling-frame and finger-bar, a foot-lever on the primary lever, and stops on the primary lever that limit its movement to a distance equal to the length of movement of the foot-lever, the action of the spring and primary lever being transmitted through the primary lever to the coupling-frame and finger-bar, tending to lighten their weight upon the ground and transmit it to the hand-lever, whereby the hand-lever is held in position against its stop on the main frame through any vibration that shall not cause a disturbance in the parts greater than the distance between the stops on the primary lever.

13. In combination in a mowing-machine, a lifting-lever having a quadrant extension, a sliding link pivoted to the finger-bar and pivoted to the coupling-frame on a sliding connection, a roller mounted on the machine-frame and located against the edge of the quadrant, and a chain connecting quadrant on the lifting-lever with the sliding link, the chain passing beneath the roller, substantially as and for the purpose specified.

14. In combination in a mowing-machine, a lifting-lever connected to a cam loosely mounted on a sliding rod by a slotted link, a cam located on this rod and fixed thereto beside the loose cam, and an arm fixed to the rod and connected to the counter-shaft of a mowing-machine, whereby the movement of the hand-lever is transmitted to the counter-shaft after it has traveled a distance equal to the slot in the link, substantially as and for the purpose specified.

15. In combination in a mowing-machine, a lever pivoted on the machine-frame and connected to the arm of a cam loosely mounted on a sliding rod, a companion cam fixed to this rod, a spring on the rod, and an arm connected to the rod and joined to the counter-shaft whereby the motion of the hand-lever for a certain distance of travel is transmitted positively to pull the sliding rod in one direction while the rod is returned to its normal position on the return of the hand-lever by the strength of the spring.

16. In combination in a mowing-machine, a rising-and-falling cutting apparatus connected with a lifting-lever mounted on the machine-frame, gearing in the frame in which is positioned a clutch, a connection between the clutch and the lifting-lever, the connection composed of a sliding bar, a spring tending to hold the bar in one direction, and companion cams mounted on the bar, one of which is loose thereon and connected by a slotted link with the lifting-lever, substantially as and for the purpose specified.

17. In combination in a mowing-machine, a spur-pinion and bevel-wheel mounted upon a counter-shaft, the spur-pinion and bevel-wheel being placed end to end, completely filling the space in the frame, the counter-shaft upon which they are mounted loosely sliding in its bearings in the frame, a key in the counter-shaft, slots in the spur-pinion and bevel-wheel through which the key slides, whereby the shaft can be slid through the spur-pinion and bevel-wheel without their partaking of its motion and the spur-pinion and bevel-wheel may be locked together.

18. In combination in a mowing-machine, a counter-shaft loosely mounted in the frame of the machine, and having a flat key extended through it, a bevel-wheel and spur-pinion mounted on the counter-shaft end to end and filling the space in the main frame, the bevel-wheel having a slot cut in it at least equal to the depth of the flat key in the counter-shaft while the spur-pinion has a slot of sufficient depth to allow the key to be projected into it part of its width, and means for moving the counter-shaft back and forth, whereby the flat pin can be drawn its width into the slot in the bevel-wheel or projected a part only of its width into the slot in the spur-pinion, thus locking these pinions together, or unlocking them, as desired.

HENRY E. PRIDMORE.

Witnesses:
WM. H. FERGUSON,
H. H. ROGERS.